UNITED STATES PATENT OFFICE.

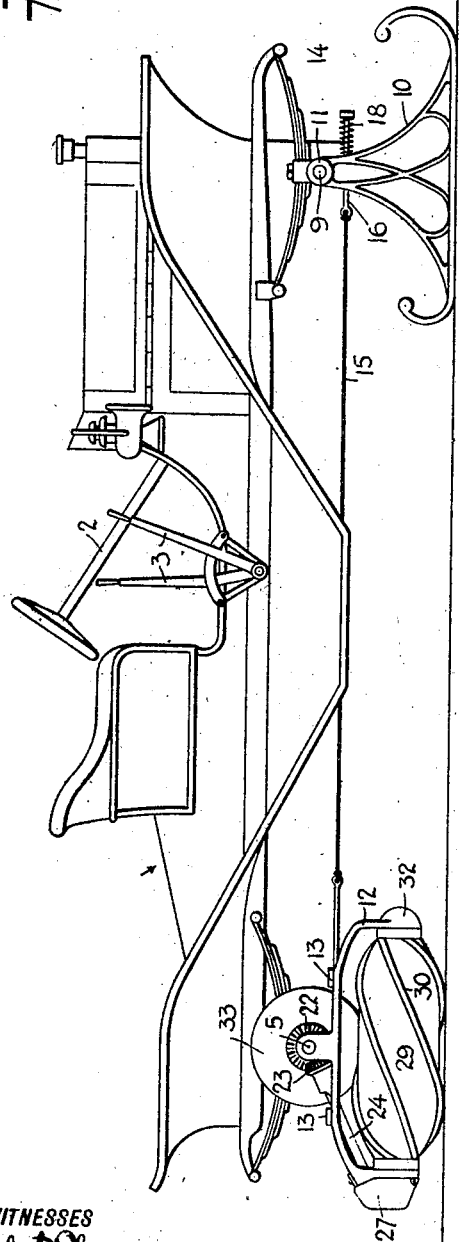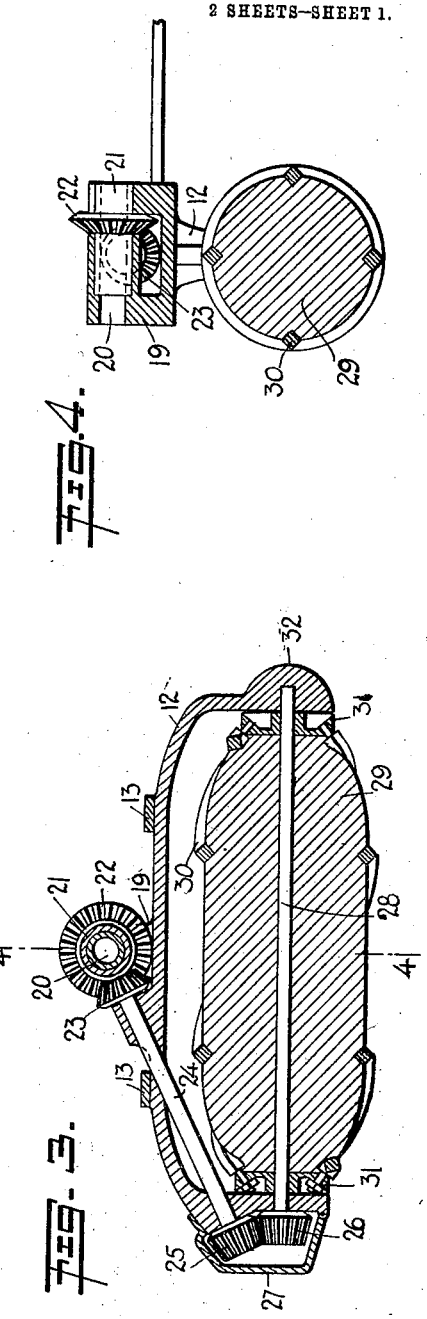

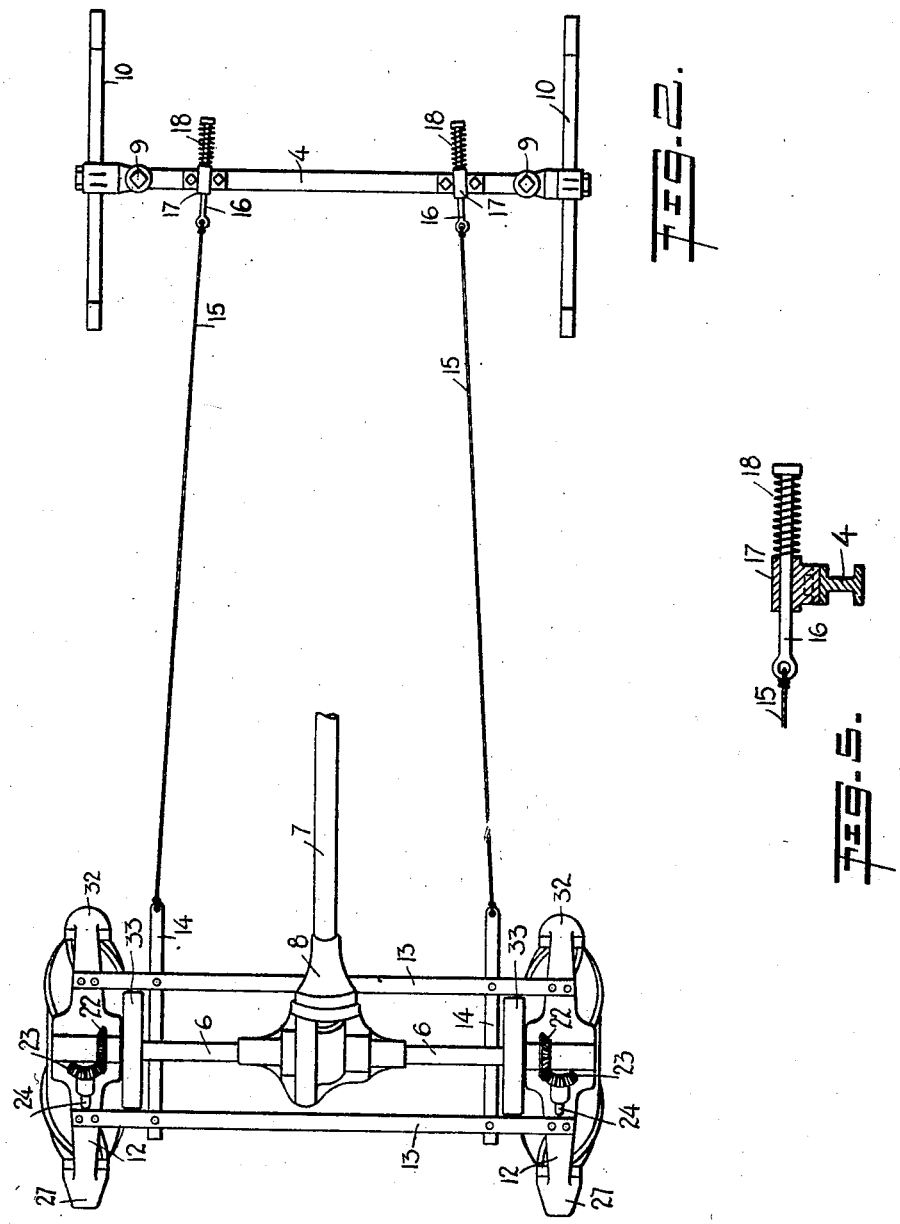

WILLIAM JOHN WRIGHT AND ROBERT HICHENS HOCKIN, OF OAK LAKE, MANITOBA, CANADA.

AUTOMOBILE SLEIGH.

1,084,997.  Specification of Letters Patent.  Patented Jan. 20, 1914.

Application filed February 5, 1913. Serial No. 746,305.

*To all whom it may concern:*

Be it known that we, WILLIAM J. WRIGHT and ROBERT H. HOCKIN, citizens of the Dominion of Canada, and residents of Oak Lake, in the Province of Manitoba and Dominion of Canada, have invented a new and Improved Automobile Sleigh, of which the following is a full, clear, and exact description.

Our invention relates to an attachment adapted to be used in connection with automobiles and other motor vehicles for the purpose of propelling such vehicles through snow, and it comprises an arrangement of parts upon which the body of an automobile or other motor vehicle can easily and readily be mounted when road conditions are such as to make the ordinary apparatus of the motor vehicle of little or no utility.

For the purpose of gaining the objects of our invention we employ a pair of runners provided with hubs so that they can be readily fitted to the front axles of the motor vehicle in place of the front wheels, and a pair of propeller drums which serve to support the rear of the automobile body, and which are connected to be driven by the rear axles thereof, these propeller drums being shaped to engage the loose snow and ice and move the automobile forward or backward, as may be desired.

Reference is to be had to the accompanying drawings forming a part of this specification, in which the same characters of reference indicate the same parts in all the views.

Figure 1 is a side elevation of our automobile sleigh; Fig. 2 is a top plan of the apparatus for imparting motion to an automobile according to our invention; Fig. 3 is a longitudinal sectional view of the propeller drums and the transmission mechanism therefor; Fig. 4 is a sectional view on the line 4—4 of Fig. 3; and Fig. 5 is a sectional view of a detail.

Our invention comprises a pair of runners which carry the front of the automobile and serve to guide the automobile or other motor vehicle, and a pair of propeller drums which support the rear of the motor vehicle, as above mentioned. The body of the automobile or other motor vehicle 1 will be provided with a steering post 2 and the usual controlling levers 3, together with a front axle 4 and rear axles or driving shafts 5 inclosed in suitable casings 6. These rear axles or drive shafts 5 will be driven by the main power shaft 7 through differential gearing 8, this mechanism being well known to all those skilled in the automobile art.

The front axle 4 of the automobile will have pivoted end sections 9 on which the front or guiding wheels are ordinarily mounted, but when the ground is covered with snow we remove these wheels and apply to these pivoted axle ends 9 a pair of sleigh runners 10 which have hubs 11 corresponding to the wheel hubs, to receive the pivoted axle ends 9. The bottoms of these runners 10 will be shaped to prevent the automobile body from skidding or sliding from side to side, and for this purpose they will be beveled, so that the inside edges will be lower than the outside edges. This will cause these runners to sink into the snow more on the inside and thus make lateral slipping or sliding impossible. These runners will be of course under control of the steering gear 2 and can be employed to turn the automobile to one side or the other, which may be wished.

The devices for propelling the motor vehicle through the snow or loose ice are arranged so as to support the rear of the automobile body 1 and be driven from the axles or shafts 5. These devices are mounted by means of a pair of inverted yokes or spans 12 which are arranged longitudinally of the vehicle beneath the ends of the axles 5 and are connected by means of cross bars 13. These cross bars 13 are joined by strengthening bars 14 and these bars 14 have their forward ends perforated and are connected by means of ropes or chains 15 to eyelets at the ends of bolts 16. These bolts 16 move in bearings 17 carried by the front axle 4 and have headed forward ends between which and the bearings are arranged springs 18 surrounding these bolts. This construction connects the propelling apparatus to the front axle to enable it to operate under all conditions. At the same time, the springs 18 will permit the framework carrying the propelling devices to yield in case of shocks, and prevent breakage or other accident. The yokes 12 are each provided with a bearing 19 cast centrally on the top of the same and having a transverse bore 20 which receives a sleeve 21. This sleeve 21 can be keyed upon the ends of the shafts 5 or fastened to these shafts in any other convenient way, so that they can be rotated by these shafts, and it carries a miter gear 22 which meshes with a miter gear 23 on a shaft 24. The sleeve 21 is received in the bore 20 of the bearing 19, this bore being enlarged to the required extent to house the sleeve, and when the shafts 5 turn, the sleeve 21 on each side of the motor vehicle at the rear thereof will be revolved and transmit motion to the shafts 24. These shafts will extend rearward and downward and are located to turn in bearings carried by the yokes 12. They carry on their rear ends miter gears 25 which mesh with miter gears 26 inclosed in gear casings 27, and each of the miter gears 26 will transmit motion to a shaft 28 journaled at its opposite ends in the ends of the yoke 12, as shown particularly in Fig. 3. The shafts 28 carry drums 29 which are provided with spiral ribs 30. These spiral ribs have their ends fastened in plates 31 located at the ends of the drum, and both the plates 31 and the drums 29 may be keyed or otherwise fastened on the shafts 28 so that they must turn therewith. The bearing for the forward ends of the shafts 28 is shown at 32.

The front axle 4 and the rear axle together comprising the shafts 5 will of course be spring connected to the chassis, and in order to drive the shafts 24 and the drums 29 the rear wheels of the automobile, shown at 33 on the drawings, may be removed or left in place, as may be desired. If they are left in place it is only necessary to secure the sleeve 21 on the outer end of the shaft 5 so that the shaft 5 in turn will transmit rotary motion to the sleeve carried on the end thereof, and any convenient means or manner of fixing the end of the shaft 5 and sleeve 21 together can be adopted.

The ends of the drums 29 are thickest in the middle and tapered at the ends, so that whichever way they are driven to drive the vehicle either forward or backward they will have a tendency to climb in the loose snow and thus pack the snow down and make a firm, hard road through the same. These drums may be made of wood covered with steel, and the ribs 29 may be so made that they fit in grooves in the drums 29 and at the same time are detachably secured to the plates 31 so that they can be taken off to be sharpened or replaced.

The operation of our invention will be apparent. The engine turns the shafts 5 and through the gearing the drums 29 and ribs 30 carried by these drums will engage the snow and have a propelling action thereon to force the motor vehicle forward or backward, according to the direction of motion taken by the shafts 5. Owing to the tapering ends of these drums they will tend to rise in the snow whether the motor vehicle be traveling forward or backward, and thus pack the snow down to make a firm, even road. The motor vehicle can be turned to the right or left by means of the runners 10, and it will be seen that the spring connection of the cross bars 13 to the front axle allows the parts sufficient play when traveling over uneven ground.

To apply our invention to an automobile it is only necessary to remove the wheels in front and apply the driving mechanism to the shafts 5 at the back, removing the rear wheels 33 if desired, or allowing them to remain in place if the owner prefers.

Having thus described our invention, we claim as new and desire to secure by Letters Patent:

1. The combination of a vehicle body having a pair of runners secured to the front axle, means for controlling said runners to guide the vehicle, a pair of inverted yoke-shaped members mounted upon rear axle, cross-bars connected to the said members, means for connecting said cross-bars and the front axle resiliently together, a propeller drum carried by each of said yoke-shaped members, and means for turning said drums to move the vehicle.

2. The combination of a motor vehicle body having a pair of runners connected to the front axle, a pair of inverted yoke-shaped bearing members mounted on the ends of the rear axle and arranged longitudinally of the vehicle, cross-bars connecting said yoke-shaped members, means for connecting said cross-bars and said front axle resiliently together, propeller drums having spiral ribs thereon mounted in said bearing members, gearing for driving the same, and means for transmitting motion to said gearing through the drive shafts of the vehicle, whereby the drums can be turned by the motive apparatus of the vehicle to cause the same to move.

3. The combination of a yoke-shaped member, a propeller drum journaled therein and having spiral ribs on its face, a bearing on the upper face of said member, a gear sleeve mounted in said bearing adapted to be connected to a drive shaft, a shaft mounted in said member, gearing between the shaft and drum, and gearing between said gear sleeve and shaft.

4. The combination of a pair of inverted yoke-shaped members, cross bars for connecting the same, a propeller drum mounted in each of said members, said drums having spiral ribs thereon, bearings carried centrally upon the top of said members, gear sleeves mounted in said bearings to be connected to the ends of the drive shafts of an automobile, and gearing connecting said gear sleeves to said propeller members, whereby the drive shafts of the automobile will rotate the propeller members.

5. The combination with the front and rear axles of a vehicle, of a pair of runners mounted on the front axle, a pair of inverted yoke-shaped members, each having a bearing on its upper face, sleeves mounted in the bearing of the said members and secured to the rear axle, a propeller drum mounted in each yoke-shaped member, and a shaft mounted in each of said members and geared at one end with the sleeve and at the other end with the drum.

In testimony whereof we have signed our names to this specification in the presence of two subscribing witnesses.

WILLIAM JOHN WRIGHT.
R. HICHENS HOCKIN.

Witnesses:
   THOS. G. TARLETON,
   MARY N. HAIGHT.

---

Copies of this patent may be obtained for five cents each, by addressing the "Commissioner of Patents, Washington, D. C."